3,541,021
CERIUM AND TERBIUM ACTIVATED ALKALINE
EARTH HALOPHOSPHATE PHOSPHOR
Hideo Mizuno, Takatsuki-shi, Japan, assignor to Matsushita Electronics Corporation, Osaka, Japan, a corporation of Japan
Filed Aug. 10, 1967, Ser. No. 659,751
Claims priority, application Japan, Aug. 17, 1966, 41/54,565
Int. Cl. C09k 1/36
U.S. Cl. 252—301.4                                6 Claims

ABSTRACT OF THE DISCLOSURE

A high efficiency phosphor for discharge lamps composed of alkaline earth metal halophosphate, having an empirical formula such as, for calcium, $$3Ca_3(PO_4)_2 \cdot CaX_2$$

Figure 1:
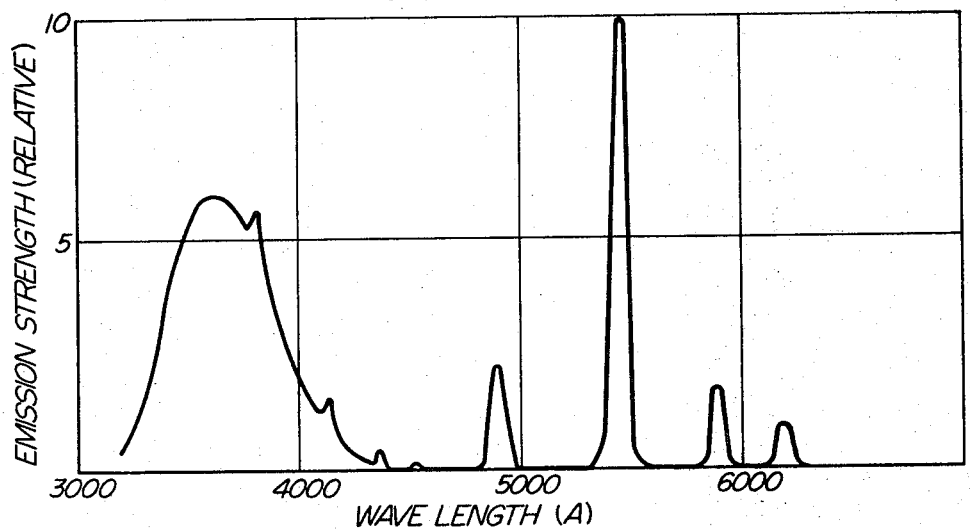

X representing fluorine or chlorine or both, activated with about 0.2–2 cerium atoms and about 0.3–6 terbium atoms per 100 atoms of alkaline earth metal. The phosphor is formed by firing the components at 1150°–1350° C. in a weak reduction atmosphere. The phosphor shows a bright green luminescence under ultra-violet ray excitation.

---

This invention relates to a new phosphor having a high efficiency for discharge lamps.

It is already known that a phosphor of excellent temperature characteristics can be prepared by using a rare earth ion of terbium or the like as an activator. However, most of such phosphors have weak luminous intensity because the absorption of the ultraviolet region by the rare earth ions is weak.

The present inventor has found that halophosphates of the alkaline earth metals having an empirical formula, such as for calcium, $3Ca_3(PO_4)_2 \cdot CaX_2$, wherein X represents a halogen, with about 1% cerium and about 0.3–6% terbium based on the contained alkaline earth metal elements produces a new phosphor which shows a bright green luminescence under ultraviolet ray excitation. As used herein, the percentages for the cerium and terbium quantities are atomic ratios based on the total atoms of alkaline earth metal in the phosphor or, in other words, the number percent of the rare earth atom represents the number of atoms per 100 atoms of alkaline earth metal in the phosphor. For example 2% cerium in the phosphor means 2 atoms of cerium per 100 atoms of alkaline earth metal present in the phosphor.

A phosphor prepared by activating calicum halophosphate with trivalent cerium is known and shows a strong ultraviolet luminescence having its peak at 3600 A. under excitation by 2537 A. ultraviolet ray. The luminescence of calcium halophosphate activated by terbium consists mainly of 5450 A. linear luminescence. When the amount of terbium added to the known cerium activated calcium halophosphate is 0.3–6%, the luminous color is a purplish-green because the cerium luminescence band is gradually weakened with the addition of terbium as activator. When the amount of terbium present is 2% or more, the cerium luminescence is nearly extinguished and only the terbium luminescence is exhibited. Under such circumstances, the luminous color becomes green, and is composed almost entirely of the terbium luminescence.

The cerium-terbium activated alkaline earth metal halophosphate phosphor in accordance with this invention shows an excited spectrum of terbium luminescence which is in good conformity with the excited spectrum of cerium luminescence where the halophosphate was activated by cerium alone. It is hypothesized from these facts that in the new phosphor of the present invention, the terbium luminescence is sensitized by the luminous center of the cerium atoms. Therefore, while the phosphor activated by the rare earth ion of terbium and the like alone is of weak luminescence because of weak absorption of the ultraviolet region, the phosphor according to the present invention shows bright terbium luminescence because the energy of the ultraviolet ray is absorbed by the luminous center of the cerium and is transmitted to the terbium presumably by means of non-radiation conversion to produce the so-called sensitized luminescence.

Further, the phosphor of the present invention has excellent temperature characteristics for the fluorescent intensity. The luminous intensity of the new cerium-terbium activated alkaline earth metal halophosphate is not significantly reduced under temperature conditions reaching as high as 400° C. On the other hand, the luminous intensity for previously known phosphors is remarkably lowered at such temperatures, and the phenomenon of so-called temperature extinction takes place.

For the firing of the phosphor of the present invention, the conventional firing process used to produce calcium halophosphate phosphor can be employed without alteration. For example, the required amounts of secondary calcium phosphate, calcium carbonate, calcium chloride, calcium fluoride, cerium oxide and terbium oxide are well-mixed and are fired at 1150°–1350° C. for the required time. At 1150° C. or less, the growth of the crystal is insufficient and the brightness of the phosphor is seriously reduced. At temperatures exceeding 1350° C., a sintering phenomenon is encountered due to the particle becoming coarse. The firing temperature for the instant process is most desirably between 1200°–1250° C.

Also, in connection with the present invention, it is desirable to employ a neutral, or weak reduction, atmosphere for the firing because the activator, cerium, is introduced in its trivalent form.

The quantity of cerium based on the percentage number of atoms of the total atoms for the alkaline earth metal component, may vary within the range of about 0.2–2%. When the amount of cerium is less than 0.2%, the luminescence of the resulting phosphor is dark, and similarly when it exceeds 2%, the luminescence is dark because of the occurrence of concentration extinction. The quantity of terbium in the phosphor in accordance with the present invention is within the range about 0.3–6%, which is the percentage number of atoms of the terbium based on the total number of atoms of the alkaline earth metal component present in the phosphor. With less than about 0.3%, the required luminescence cannot be obtained, while the brightness is reduced by adding more than 6%.

It is also possible in accordance with the present invention to prepare the so-called halophosphate phosphor by substituting strontium and barium for a part of the calcium ions. Under such circumstances, the luminous spectrum, temperature characteristics and the like, are affected insignificantly.

Additionally, it has also been found that the luminescence of the phosphor in accordance with the present invention can be caused by electron beam or X-ray excitation as well as 2537 A. ultra-violet ray excitation.

Figure 2:
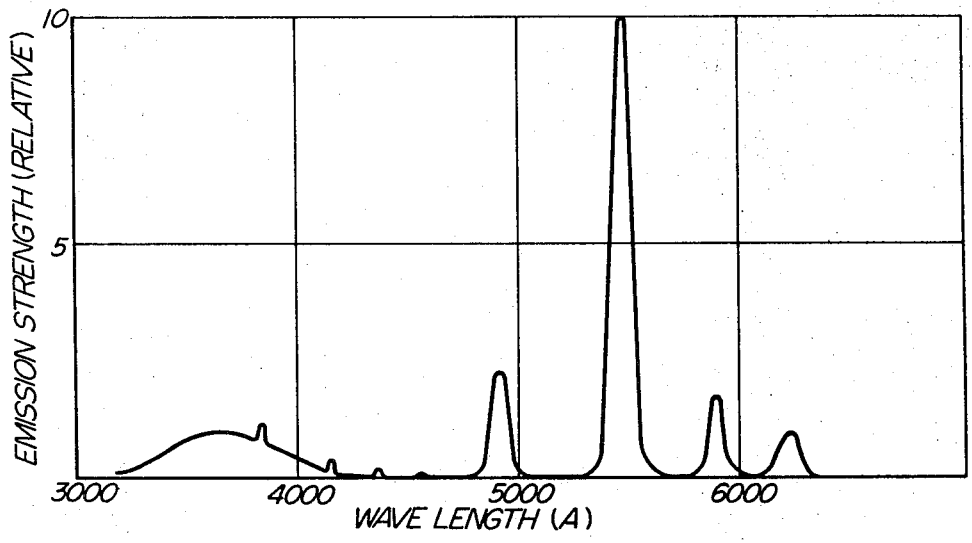

The drawings which form a part of this application are specifically incorporated by reference. FIG. 1 illustrates the luminous spectra produced by the phosphor made in accordance with Example 1 under 2537 A. ultra-violet ray excitation. FIG. 2 illustrates the same for the phosphor of Example 2.

The present invention is illustrated by the following examples.

EXAMPLE 1

| | G. |
|---|---|
| Secondary calcium phosphate | 816 |
| Calcium carbonate | 220 |
| Calcium fluoride | 39 |
| Calcium chloride (anhydrous) | 55.5 |
| Cerium oxide ($Ce_2O_3$) | 16.4 |
| Terbium oxide ($Tb_4O_7$) | 5.6 |

The above compounds in their respective quantities were well-ground and mixed. Thereafter the mixture was fired for two hours at 1230° C. in nitrogen gas flow. The phosphor produced showed a purplish-green fluorescence under excitation of 2537 A. ultra-violet ray, the wavelength components of which are shown in relative proportions in FIG. 1.

EXAMPLE 2

| | G. |
|---|---|
| Secondary calcium phosphate | 816 |
| Calcium carbonate | 200 |
| Calcium fluoride | 39 |
| Calcium chloride (anhydrous) | 55.5 |
| Cerium oxide ($Ce_2O_3$) | 16.4 |
| Terbium oxide ($Tb_4O_7$) | 37.4 |

The compounds listed above in their respective quantities were well-ground and mixed, and the mixture was fired at 1230° C. for two hours in nitrogen gas flow. The phosphor obtained showed a green fluorescence under excitation of 2537 A. ultra-violet ray, the wavelength components of which are illustrated in FIG. 2.

EXAMPLE 3

| | G. |
|---|---|
| Secondary calcium phosphate | 816 |
| Calcium carbonate | 200 |
| Calcium fluoride | 39 |
| Strontium chloride (anhydrous) | 79 |
| Cerium oxide ($Ce_2O_3$) | 16.4 |
| Terbium oxide ($Tb_4O_7$) | 37.4 |

After the listed materials in their respective quantities were well-ground and mixed, the mixture was fired at 1230° C. for two hours in nitrogen gas flow. The phosphor obtained showed a bright green fluorescence under excitation of 2537 A. ultra-violet ray.

What is claimed is:
1. An activated alkaline earth metal halophosphate phosphor wherein the alkaline earth metal is selected from the group consisting of calcium, strontium, barium, and a mixture thereof; the halogen component of said halophosphate is selected from the group consisting of fluorine, chlorine, and a mixture thereof; and said phosphor is activated by about 0.2–2% atoms cerium and about 0.3–6% atoms terbium per atom of alkaline earth metal.
2. The phosphor in accordance with claim 1, wherein said alkaline earth metal is calcium.
3. The phosphor in accordance with claim 1, wherein said alkaline earth metal is a mixture of calcium and strontium.
4. The phosphor in accordance with claim 1, wherein said cerium atoms are about 1%.
5. The phosphor in accordance with claim 1, wherein said cerium and terbium are in trivalent form.
6. The method of producing a green luminous color which comprises 2537 A. ultra-violet ray excitation of an alkaline earth metal halophosphate phosphor containing about 0.2–2 cerium atoms and about 0.3–6 terbium atoms per 100 atoms of alkaline earth metal.

References Cited

UNITED STATES PATENTS

| 3,014,874 | 12/1961 | Ranby. | |
|---|---|---|---|
| 3,079,347 | 2/1963 | Garrett et al. | 252—301.4 |
| 2,488,733 | 10/1949 | McKeag et al. | |
| 3,430,090 | 2/1969 | Vodoklys et al. | |

TOBIAS E. LEVOW, Primary Examiner

R. D. EDMONDS, Assistant Examiner